March 10, 1942.　　F. H. MALONEY　　2,275,972
DISPENSING DEVICE
Filed May 10, 1939
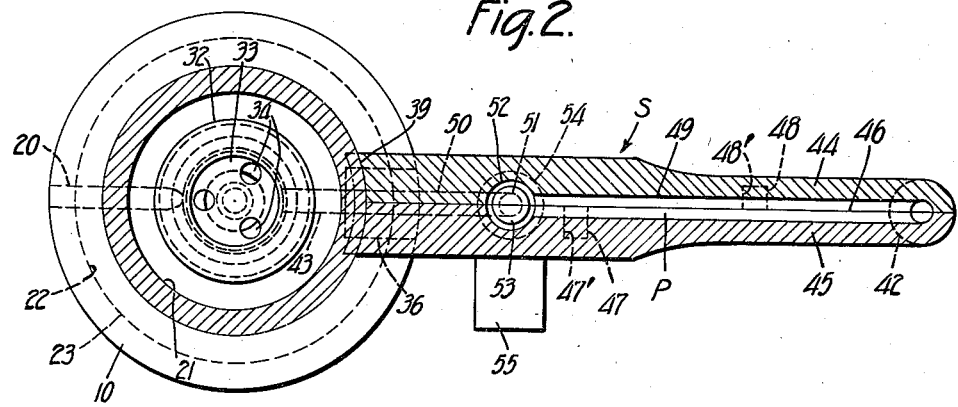
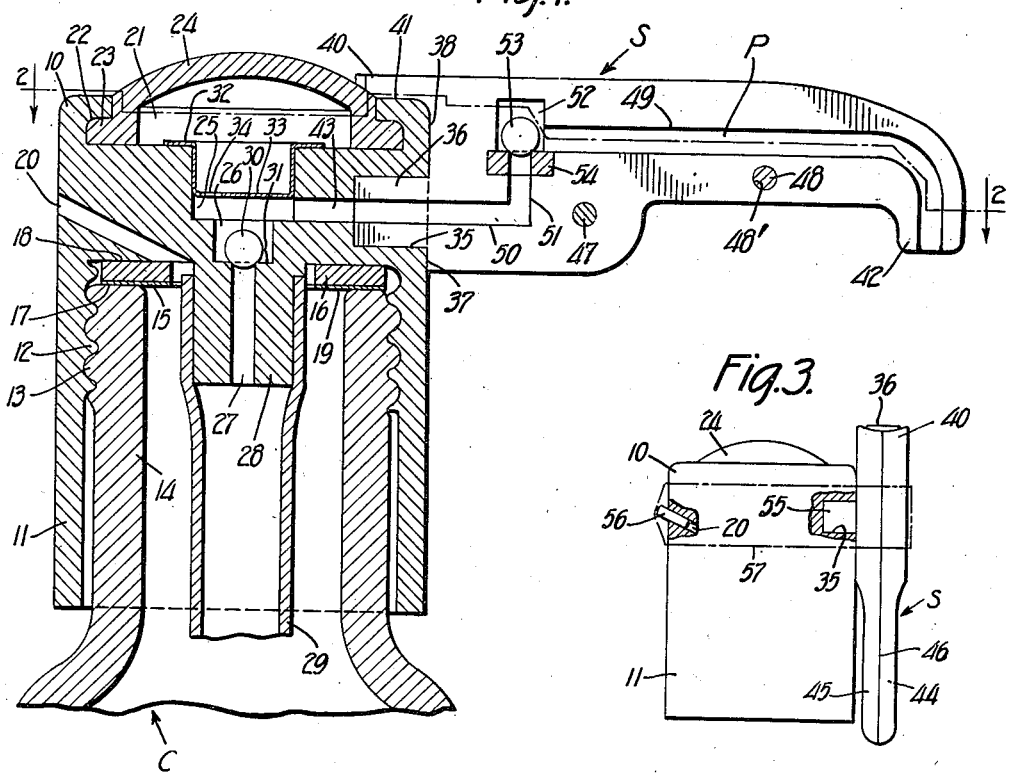
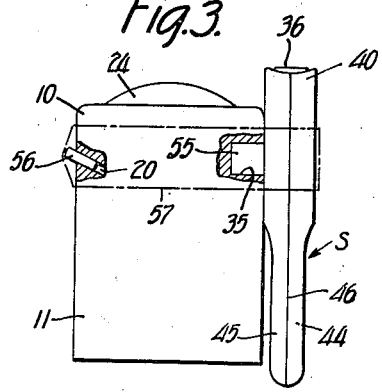
INVENTOR.
Frank H. Maloney
BY Moses + Nolte
ATTORNEYS Patented Mar. 10, 1942

2,275,972

UNITED STATES PATENT OFFICE 2,275,972

DISPENSING DEVICE

Frank H. Maloney, Elmhurst, Long Island, N. Y., assignor to Brass Goods Manufacturing Co., Brooklyn, N. Y., a corporation of New York Application May 10, 1939, Serial No. 272,800

1 Claim. (Cl. 221—85)

This invention relates to a liquid dispensing device and more particularly to a device adapted to form a closure member for a bottle which is provided with a manually controlled means for determining the rate or quantity of flow of a liquid from the bottle. The invention has particular utility when applied to a bottle or other container holding a liquid which it is desired to dispense in small amounts, such as a few drops, such as facial lotions, shaving preparations, and similar cosmetic preparations, but it will be understood that the invention is not limited to dispensing liquids of these types but can be used with equal facility for dispensing any liquid in small, controlled amounts.

It is an object of the invention to provide a bottle or other container stopper with an improved device within the body of the stopper whereby liquid may be delivered therefrom under the control of the pressure of a thumb or finger thereon.

Another object is to provide a device for dispensing liquid from a closed container with a suitable passage for admitting air to the container to replace the liquid dispensed and means for readily closing the passage in order to prevent the leakage of liquid from the container during its transportation to the consumer or dealer.

A further object of the invention is to provide a device of the type characterized which will readily deliver small controlled amounts in the form of a few drops or a small stream at the will of the user.

A still further object is to provide a liquid dispenser adapted to be readily screwed onto the top of a container and having valves as component parts thereof which are located above the level of the liquid in the container.

Another object is to provide a dispensing device with a discharge tube which seats a discharge valve and is readily separable from an aperture in the main stopper portion, the discharge tube being provided with a projecting portion adapted to form a closure member for the aperture and to attach the discharge tube to the main stopper portion during transportation of the device to the user thereof.

A cognate object is to construct the discharge tube of two mating sections, means being provided to register accurately the two sections during assembly thereof and the two sections providing a compartment to contain a discharge valve. Further objects will become apparent to those skilled in the art as the description of the invention proceeds.

For a better understanding of the invention reference is made to the accompanying drawing in which the same reference characters are used to designate corresponding parts in the different figures.

Fig. 1 is a sectional view taken on the longitudinal axis of a container showing a dispenser embodying the invention attached to the top thereof, the upper portion only of the container being shown;

Fig. 2 is a sectional view of the dispensing device of Fig. 1 taken on the line 2—2 of Fig. 1, and Fig. 3 is a view partly in elevation and partly in section showing the dispenser of Fig. 2 on a reduced scale and with the discharge tube as attached thereto during transportation of the device.

The dispenser comprises a substantially cylindrical cap member 10 provided with a downwardly extending annular skirt portion 11 which is interiorly threaded as at 12 to engage the threaded portion 13 formed on the exterior of the neck 14 of the bottle or other closed container C. Resilient washers 15 and 16 are interposed between the flat end surface 17 of the neck 14 and the flat surface 18 which defines the upper end of the skirt portion 11, both the washers 15, 16 being preferably made of flexible material, the upper washer 16 may for example be formed of cardboard, the fibers of which are rather loose and have not been pressed compactly together so that the material has a substantial degree of resiliency. The lower washer 15 may be formed of a thinner and more compact heavy paper or cardboard and its lower surface 19 may be coated with a suitable varnish or other filling material so as to form a tight joint between it and the upper end of the neck 14. A cylindrical bore 20 terminating in the surface 18 leads to the exterior surface of the cap 10 for the purpose of admitting air to the interior of the container C.

An opening 21 is provided in the upper end of cap 10 which is undercut as shown at 22 to engage an outwardly extending flange 23 provided at the lower end of a hollow deformable lip 24, whose upper surface is preferably convex, as shown. Lip 24 is formed of a resilient, flexible material such as rubber and forms a closure to the opening 21. A passage extending vertically through the center of cap 10 and comprising the holes 25, 26 and 27 of successively smaller diameters, serves to connect opening 21 with the interior of container C. Depending from the middle portion of cap 10 is a tubular extension 28 over whose exterior surface is adapted to be stretched the upper end of a rubber tube 29 which extends down into the liquid (not shown) within the container. A ball 30, adapted to seat on the shoulder 31 formed at the upper end of bore 27, serves to admit the liquid upwardly through this bore and to prevent its return therethrough. A valve retaining member 32 is provided for snug engagement with the bounding surface of bore 25 and terminates in a flat plate 33 through which the spaced apertures 34 extend. The retainer 32 prevents the ball 30 from getting up into the space 21 if the dispensing device should accidentally be inverted but permits the liquid to be drawn up into the space 21. Furthermore, should ball 30 be displaced upwardly by a sufficient amount to strike plate 33 during the dispensing operation, it will contact it at its center portion and not cover up one of the apertures 34.

At the side opposite passage 20, cap 10 is provided with a cylindrical bore 35 into which a cylindrical plug 36 extending from one end of the discharge spout S fits snugly. Above and below plug 36 the end of spout S is provided with vertical portions 37, 38 which are curved as indicated at 39 to conform to the cylindrical surface of cap 10 and at its upper end, spout S is provided with a horizontal extension 40 whose lower edge rests against the upper surface of cap 10, as indicated at 41. By means of the construction described, spout S may be easily attached to and detached from cap 10 and is firmly held in position after being attached.

At its discharge end, spout S is provided with a downwardly extending tip 42, a passage P extending from the tip 42 through the plug 36 where it connects to the bore 25 through a short connecting passage 43. Spout S is preferably formed of two similar mating members 44, 45 which abut each other in a vertical plane passing through the center of the spout, as indicated at 46, and one half of the passage P is formed in each of the members 44, 45. Members 44, 45 are aligned in exact registry by means of short dowel pins 47 and 48, pin 47 being secured to member 44 and entering a corresponding recess 47' provided in member 45 while pin 48 is secured to member 45 and enters the recess 48' in member 44.

As shown in Fig. 1, passage P comprises two horizontal branches 49, 50 which are connected by a vertical branch 51, branch 51 extending above the horizontal branch 49 to provide a clearance space 52 for a ball outlet valve 53. At an intermediate region passage 51 is further enlarged to accommodate a thin annular valve seat 54, as shown. The cap 10 and discharge spout S may be made of any suitable material, preferably a molded plastic material such as one of the phenol condensation plastics, hard rubber etc. On a side face of one member forming the spout S, a cylindrical plug 55 is formed which is adapted to enter the bore 35 and thus seal the end of passage 43 until the dispenser is to be used. A small plug 56 is also provided to close the end of passage 20 as shown in Fig. 3. With the parts so assembled the cap 10 is screwed firmly onto the neck 14 of container C, thereby compressing the washers 15 and 16 and tightly sealing the container. A paper or other band 57 may be wrapped around cap 10 and discharge spout S as shown in Fig. 3 for the purpose of retaining these members in assembled relation before reaching the user.

In assembling the spout S, a layer of any suitable adhesive is applied to the inner surface of the members 44, 45 before they are pressed together and the ball 53 and annular valve seat 54 are also placed in position at this time. After the adhesive sets, the ball 53 and valve seat 54 cannot be displaced out of their proper positions or become lost. Upon receiving the container with the cap 10 and spout S assembled as shown in Fig. 3, the user removes the band 57 and the spout from the cap 10, thereupon inserting the plug 36 into bore 35 and pressing the spout into its operating position, as shown in Figs. 1 and 2. Upon withdrawing the plug 56 from passage 20, the dispenser is then ready for use.

In operation, pressure of the finger on the flexible lip 24 causes air to be displaced out of passage 43, raising the ball 53 from its seat 54. Upon release of lip 24, its resiliency causes it to flex upwardly into its normal position as shown in Fig. 1 thereby reducing the air pressure in the space 21. The atmospheric pressure acting on the top surface of the liquid in container C causes the liquid to rise in tube 29. This process is repeated until the liquid fills the space above the ball 30 and the entire passage P. Upon depression of lip 24 the ball valve 30 prevents the passage of the liquid downward through the passage 27, while causing the ball 53 to be displaced upwardly a small amount and the discharge of a drop, a few drops or a small stream of the liquid from the tip 42 of the discharge spout S.

I have described what I believe to be the best embodiments of my invention. I do not wish, however, to be confined to the embodiments shown, but what I desire to cover by Letters Patent is set forth in the appended claim.

I claim:

A device for dispensing fluid comprising in combination a cap member provided with a passage extending from its upper to its lower surfaces, a resilient exposed member secured to the upper end of said cap and adapted to close the upper end of said passage, means for supporting said cap and resilient member above the level of the fluid, a valve arranged to close said passage upon depression of said resilient member, comprising a ball, a seat therefor, and a ball retaining member extending across the said passage a short distance above the ball, the retaining member being provided with a plurality of spaced apertures, said cap member being provided with a second passage passing through the side of the cap member and connecting with said first passage above said valve, a discharge spout secured to the side of said cap and provided with a discharge passage connecting with said second passage, and an outlet valve mounted in said discharge spout and adapted to be opened upon the compression of said resilient member.

FRANK H. MALONEY.